(12) United States Patent
Yang (10) Patent No.: US 11,115,189 B2
(45) Date of Patent: Sep. 7, 2021

(54) VERIFYING A BLOCKCHAIN-TYPE LEDGER

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/809,251

(22) Filed: Mar. 4, 2020

(65) Prior Publication Data

US 2020/0204348 A1 Jun. 25, 2020

Related U.S. Application Data

(63) Continuation of application No. PCT/CN2020/071352, filed on Jan. 10, 2020.

(30) Foreign Application Priority Data

Jun. 3, 2019 (CN) .......................... 201910476256.2

(51) Int. Cl.
*G06F 11/30* (2006.01)
*H04L 9/06* (2006.01)
(Continued)

(52) U.S. Cl.
CPC .......... *H04L 9/0637* (2013.01); *G06F 16/182* (2019.01); *G06F 16/22* (2019.01); *H04L 9/3297* (2013.01); *H04L 2209/38* (2013.01)

(58) Field of Classification Search
CPC . H04L 9/0637; H04L 9/3297; H04L 2209/38; H04L 63/123; H04L 9/3239; G06F 16/22; G06F 16/182; G06F 16/9024
See application file for complete search history.

(56) References Cited

U.S. PATENT DOCUMENTS 10,600,050 B1 * 3/2020 Anton ................ G06Q 20/3672
10,929,352 B2 * 2/2021 Nation ................ G06F 16/1805
(Continued)

FOREIGN PATENT DOCUMENTS

CN      101213604      7/2008
CN      106600403      4/2017
(Continued)

OTHER PUBLICATIONS

PCT International Search Report and Written Opinion in International Application No. PCT/CN2020/071352, dated Apr. 8, 2020, 21 pages (with machine translation).
(Continued)

*Primary Examiner* — Fatoumata Traore
*Assistant Examiner* — Carlton Johnson
(74) *Attorney, Agent, or Firm* — Fish & Richardson P.C.

(57) ABSTRACT

Implementations of this disclosure provide verification in a blockchain-type data storage ledger. An example method performed by a server includes receiving a verification request that includes a hash value to be verified; determining a data record of the blockchain-type data storage ledger that corresponds to the hash value to be verified; obtaining a value of a service attribute included in the data record; determining a set of data records of the blockchain-type storage ledger that correspond to the value of the service attribute in the blockchain-type data storage ledger; determining one or more data blocks of the blockchain-type data storage ledger that store data records included in the set of data records; and performing integrity verification on each one of the data blocks that store the data records included in the set of data records.

21 Claims, 3 Drawing Sheets

S101: Receive data records to be stored, and determine hash values of the data records, where the data records include service attributes S103: When a predetermined block generation condition is reached, determine data records to be written in a data block, and generate the Nth data block including a hash value of the data block and the data records (51) Int. Cl.
*H04L 9/32* (2006.01)
*G06F 16/22* (2019.01)
*G06F 16/182* (2019.01)

(56) References Cited

U.S. PATENT DOCUMENTS

2017/0091726 A1 3/2017 Morgan et al.
2017/0364552 A1* 12/2017 Pattanaik .............. H04L 9/3297
2018/0121923 A1 5/2018 Uhr et al.

FOREIGN PATENT DOCUMENTS

| CN | 106899680 | 6/2017 |
| CN | 107464118 | 12/2017 |
| CN | 108416696 | 8/2018 |
| CN | 108510252 | 9/2018 |
| CN | 108573381 | 9/2018 |
| CN | 109087101 | 12/2018 |
| CN | 109242500 | 1/2019 |
| CN | 109409136 | 3/2019 |
| CN | 109493043 | 3/2019 |
| CN | 110349019 | 10/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

S101 Receive data records to be stored, and determine hash values of the data records, where the data records include service attributes

S103 When a predetermined block generation condition is reached, determine data records to be written in a data block, and generate the Nth data block including a hash value of the data block and the data records

FIG. 1

| Transaction hash | | | |
|---|---|---|---|
| Input information | | Output information | |
| Source transaction hash | Index | Output amount | Output address |

VERIFYING A BLOCKCHAIN-TYPE LEDGER

CROSS-REFERENCE TO RELATED APPLICATIONS

This application is a continuation of PCT Application No. PCT/CN2020/071352, filed on Jan. 10, 2020, which claims priority to Chinese Patent Application No. 201910476256.2, filed on Jun. 3, 2019, and each application is hereby incorporated by reference in its entirety.

TECHNICAL FIELD

Implementations of the present specification relate to the field of information technologies, and in particular, to verification methods, apparatuses, and devices in a blockchain-type ledger that stores data based on a blockchain data structure (e.g., in a form of blockchain).

BACKGROUND

During verification in blockchain-type ledgers (including a blockchain ledger and a centralized blockchain-like ledger), a transaction, a block, or a segment of consecutive blocks is usually verified. In many scenarios, many transactions or blocks during verification are not of concern to a user.

SUMMARY

An objective of implementations of the present application is to provide methods for implementing discontinuous verification in a blockchain-type ledger.

To alleviate the previously described technical problem, the implementations of the present application are implemented as follows:

An implementation of the present specification provides a verification method in a blockchain-type ledger, where the method is applied to a server that stores data by using a blockchain-type ledger, and the method includes: receiving a verification request, where the verification request includes a hash value to be verified; determining a data record corresponding to the hash value to be verified, and obtaining a value of a service attribute included in the data record, where the service attribute is used to identify a type of the data record; determining a set of data records corresponding to the value of the service attribute in the ledger, and determining each one of data blocks that store the data records; and performing integrity verification on each one of the data blocks that store the data records.

Correspondingly, an implementation of the present specification further provides a verification apparatus in a blockchain-type ledger, where the apparatus is applied to a server that stores data by using a blockchain-type ledger, and the apparatus includes: a receiving module, configured to receive a verification request, where the verification request includes a hash value to be verified; a service attribute value acquisition module, configured to determine a data record corresponding to the hash value to be verified, and obtain a value of a service attribute included in the data record, where the service attribute is used to identify a type of the data record; a data block determining module, configured to determine a set of data records corresponding to the value of the service attribute in the ledger, and determine each one of data blocks that store the data records; and a verification module, configured to perform integrity verification on each one of the data blocks that store the data records.

It can be understood from the previously described technical solutions provided in the implementations of the present application that, in the implementations of the present application, for a verification request initiated by a user, a data record can be obtained based on a hash value, and then source tracing can be initiated based on a value of a service attribute included in the data record, to obtain a set of data records directly related to the value of the service attribute, so that corresponding integrity verification can be performed on each one of the data blocks that store the data records, thereby improving verification efficiency and user experience.

It should be understood that the previous general description and the following detailed description are merely illustrative examples, and cannot limit the implementations of the present specification.

In addition, any of the implementations of the present specification does not need to achieve all the previously described effects.

BRIEF DESCRIPTION OF DRAWINGS

To describe the technical solutions in the implementations of the present specification or in the existing technology more clearly, the following briefly describes the accompanying drawings required for describing the implementations or the existing technology. Clearly, the accompanying drawings in the following description merely show some implementations recorded in the implementations of the present specification, and a person of ordinary skill in the art can still derive other drawings from these accompanying drawings.

DESCRIPTION OF IMPLEMENTATIONS

The present specification describes the technical solutions in the implementations of the present specification in detail with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope.

Figure 1:
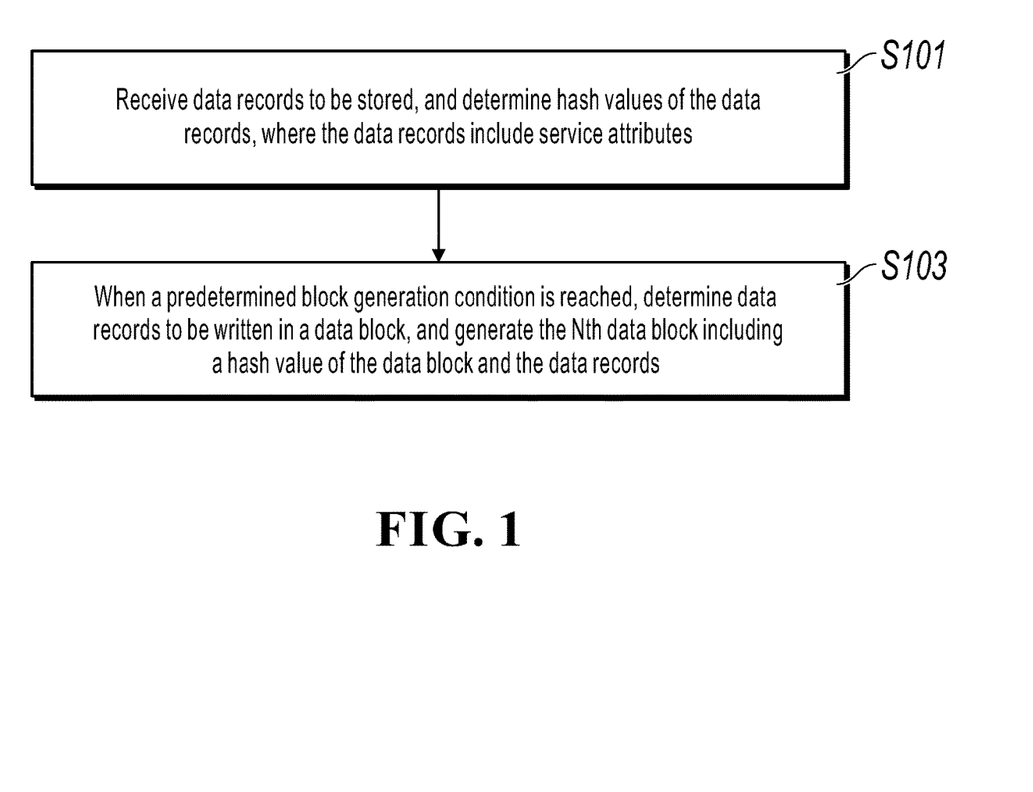
FIG. 1 is a schematic diagram illustrating a process of generating a blockchain-like ledger, according to an implementation of the present specification.

Blockchain-type ledgers can include a blockchain ledger and a blockchain-like ledger. A structure and a generation method of the blockchain ledger are very common, and details are omitted here for simplicity. The implementations of the present specification further provide a blockchain-like ledger that centrally stores data. For the blockchain-like ledger that centrally stores data, in a database server, a data block can be generated in the following way. FIG. 1 is a schematic diagram illustrating a process of generating a blockchain-like ledger, according to an implementation of the present specification. The process includes the following steps.

S101. Receive data records to be stored, and determine hash values of the data records, where the data records include service attributes.

The data records to be stored here can be various user consumption records of a personal user at a client, or can be a service result, an intermediate status, an operation record, etc. generated when an application server executes service logic based on a user instruction. A specific service scenario can include a consumption record, an audit log, a supply chain, a government supervision record, a medical record, etc.

The service attributes can include a user name, a user identity card number, a driver license number, a mobile phone number, a project unique number, etc. based on different service scenarios. Specific values of the service attributes can indicate types, such as owners or properties, of the data records.

For example, for a third-party payment institution, if data records are user consumption records, service attributes in this case are user identifiers (including a mobile phone number, an identity card number, a user name, etc.), or hash values obtained by performing a hash algorithm on the user identifiers. Alternatively, for a government institution, if data records are overheads of multiple public projects, service attributes in this case can be the unique numbers of the projects.

Specific locations of the project attributes in the data records can be negotiated in advance between the database server and a connected institution. For example, when the data records provided by the connected institution are standard structured data records, specified identification fields can be obtained from specified offsets in the data records, or start locations and end locations of the specified identification fields are identified by using specific characters. Alternatively, when the data records provided by the connected institution are unstructured data, the connected institution can splice a header that includes a service attribute with the beginning of each data record when the connected institution uploads the data records, and the database server can directly obtain a specified identification field in each data record from the header.

S103. When a predetermined block generation condition is reached, determine data records to be written in a data block, and generate the Nth data block including a hash value of the data block and the data records.

The predetermined block generation condition includes: a quantity of data records to be stored reaches a quantity threshold. For example, a new data block is generated each time one thousand data records are received, and the one thousand data records are written in the block. Alternatively, the predetermined block generation condition includes: a time interval from the last block generation time reaches a time threshold. For example, a new data block is generated every five minutes, and data records received in the five minutes are written in the block.

N here is a sequence number of the data block. In other words, in this implementation of the present specification, data blocks are arranged in a blockchain form based on a sequence of block generation times, and have a strong time sequence feature. A block height of the data block monotonically increases based on the sequence of the block generation times. The block height can be a sequence number, and in this case, a block height of the Nth data block is N. Alternatively, the block height can be generated by using other methods.

When N=1, the data block in this case is an initial data block. A hash value and a block height of the initial data block are given based on a predetermined way. For example, if the initial data block includes no data record, the hash value is any given hash value, and the block height blknum=0. For another example, a trigger condition for generating the initial data block is consistent with a trigger condition for generating another data block, but the hash value of the initial data block is determined by performing hashing on all content in the initial data block.

When N>1, because content and a hash value of a previous data block have been determined, in this case, a hash value of the current data block (the Nth data block) can be generated based on the hash value of the previous data block (that is, the (N−1)th data block). For example, in a feasible way, a hash value of each data record to be written in the Nth data block is determined, a Merkel tree is generated based on a sequence of the data records in the block, a root hash value of the Merkel tree is spliced with the hash value of the previous data block, and the hash value of the current data block is generated by using a hash algorithm again. For another example, splicing and hashing can be performed based on a sequence of the data records in the block to obtain an overall hash value of the data records, the hash value of the previous data block can be spliced with the overall hash value of the data records, and a hash operation is performed on a character string obtained after the splicing to generate the hash value of the data block.

After successfully uploading data, a user can obtain and store a hash value of a corresponding data record and a hash value of a data block including the corresponding data record, and can initiate integrity verification based on the hash value. A specific verification method is recalculating a hash value of the data record and a hash value of the data block including the data record in a database, and then comparing the hash value of the data record and the hash value of the data block including the data record with the locally stored hash values.

According to the previously described data block generation method, each data block is determined by using a hash value, and the hash value of the data block is determined based on content and a sequence of data records in the data block and a hash value of a previous data block. A user can initiate verification at any time based on a hash value of a data block. Modification to any content in the data block (including modification to content or a sequence of data records in the data block) results in inconsistency between a hash value of the data block obtained through calculation during verification and a hash value of the data block during data block generation, causing a verification failure. Therefore, tamper-resistance under centralization is implemented.

During verification in the blockchain-type ledger, generally, continuous integrity verification is performed on a specified segment of data blocks, or continuous integrity verification is performed starting from an initial data block. A verification method is obtaining a hash value of a previous data block, and recalculating a hash value of a data block based on data records in the data block and the hash value of the previous data block by using the same algorithm for generating a hash value of the data block.

The blockchain-like ledger and the value of the service attribute in the blockchain-like ledger in the implementations of the present specification are described above.

In the blockchain ledger, a generation method and a structure of a block are not described here for simplicity. It is worthwhile to note that a service attribute also exists in the blockchain ledger. For example, for a public bitcoin blockchain (a blockchain system of another publicly issued currency is similar), in a bitcoin transfer process, an unspent transaction output (UTXO) is used as a core to transfer bitcoin between users. In bitcoin, it is specified that an input of each new transaction must be a certain UTXO.

Figure 2:
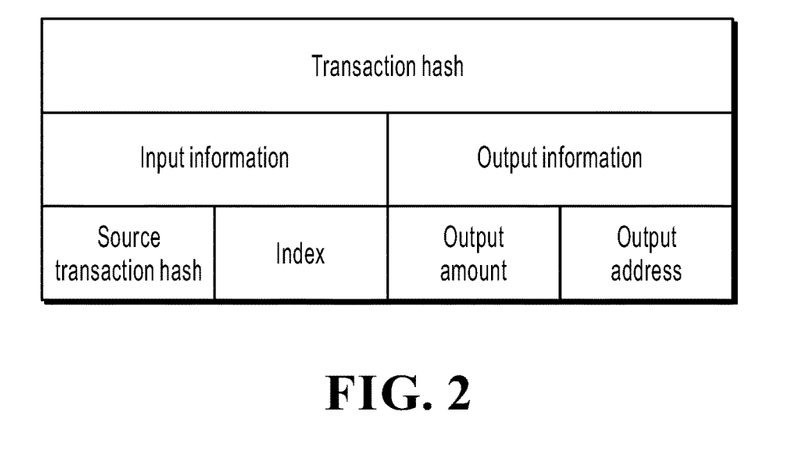
FIG. 2 is a schematic diagram illustrating a format of a transaction in bitcoin.

In other words, all legitimate bitcoin transactions can be traced back to outputs of one or more previous transactions. Sources of these chains are mining rewards, and the end of these chains is current UTXOs. FIG. 2 is a schematic diagram illustrating a data format of a transaction in bitcoin.

In bitcoin, the transaction mainly includes two parts: input information and output information. The input information records source pre-txhash (that is, a source transaction hash in FIG. 2) of an input fund, that is, a transaction in a global ledger is specified by using a hash value of a source transaction, and the source transaction is the previously descried UTXO. The output information records account information of a receiver of the current transaction, including an output address and an output amount.

In other words, an account balance seen in a bitcoin wallet is actually obtained by the wallet by scanning the blockchain, and aggregating and adding all UTXOs belonging to the account (corresponding to the address).

For any transaction in bitcoin, source tracing can be performed based on a "previous hash value" included in the transaction, to obtain a path that points to an initial mining reward, where the path runs through multiple users based on multiple different transactions, but it is difficult for the users to be aware of the path. However, actually, the users are most interested in all the transactions on the path and data blocks including the transactions on the path based on their own interests.

It is worthwhile to note that the transaction is also a data record, that is, the data record involved in the present specification can include a transaction in a blockchain.

Figure 3:
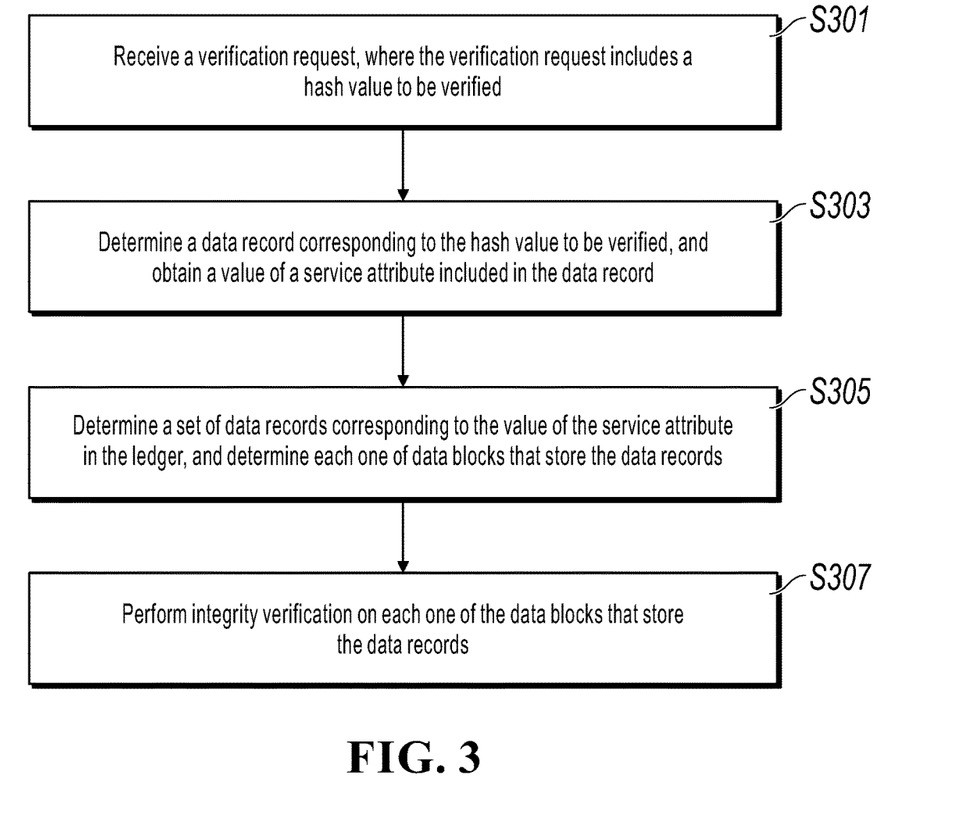
FIG. 3 is a schematic flowchart illustrating a verification method in a blockchain-type ledger, according to an implementation of the present specification.

On this basis, an implementation of the present specification provides a verification method in a blockchain-type ledger. FIG. 3 is a schematic flowchart illustrating a verification method in a blockchain-type ledger, according to an implementation of the present specification. The method is applied to a server that stores data by using a blockchain-type ledger, and the method includes the following steps.

S301. Receive a verification request, where the verification request includes a hash value to be verified.

S303. Determine a data record corresponding to the hash value to be verified, and obtain a value of a service attribute included in the data record.

In the blockchain-type ledger, regardless of a blockchain ledger or a blockchain-like ledger, a data record (also referred to as a transaction in the blockchain ledger) corresponding to a hash value can be obtained at least by traversing the ledger.

In an implementation, a corresponding first index can be further provided to facilitate querying. For example, a first index about a hash value of a data record, a height of a block including the data record, and an offset of the data record in the block can be established, so that a data record corresponding to a hash value can be conveniently obtained by querying the first index.

After a data record is obtained, a value of a service attribute included in the data record can be obtained from a specified location. In a bitcoin-type blockchain ledger, a value of a service attribute is "pre-txhash" included in the previously described transaction.

In the blockchain-type ledger, a value of a service attribute is a character string corresponding to a specified field. A specific specified field can be agreed on with a connected service party in advance. For example, a header of a data record is used as a specified field recording a service attribute. The service attribute usually can be a user identifier, a user identifier hash, a project number, etc. For example, a format of a data record, whose header is spliced with a user identifier (that is, a service attribute), and that is sent to the server is user identifier+data record.

S305. Determine a set of data records corresponding to the value of the service attribute in the ledger, and determine each one of data blocks that store the data records.

In a blockchain system similar to bitcoin for transaction, data records corresponding to a value of a service attribute are multiple transactions on the same transaction path. Tracing can be performed based on "pre-txhash" (that is, a hash value of a previous transaction) included in each transaction in the path until an initially generated transaction of a virtual currency (that is, bitcoin) is obtained. A set of data records is all the transactions on the path.

In the blockchain-like ledger provided in this implementation of the present specification, based on a value of the same service attribute, multiple data records including the value can be determined, for example, consumption records belonging to the same user, or accounts belonging to the same project can be determined. In this case, a set of data records is the multiple data records including the service attribute.

Figure 6:
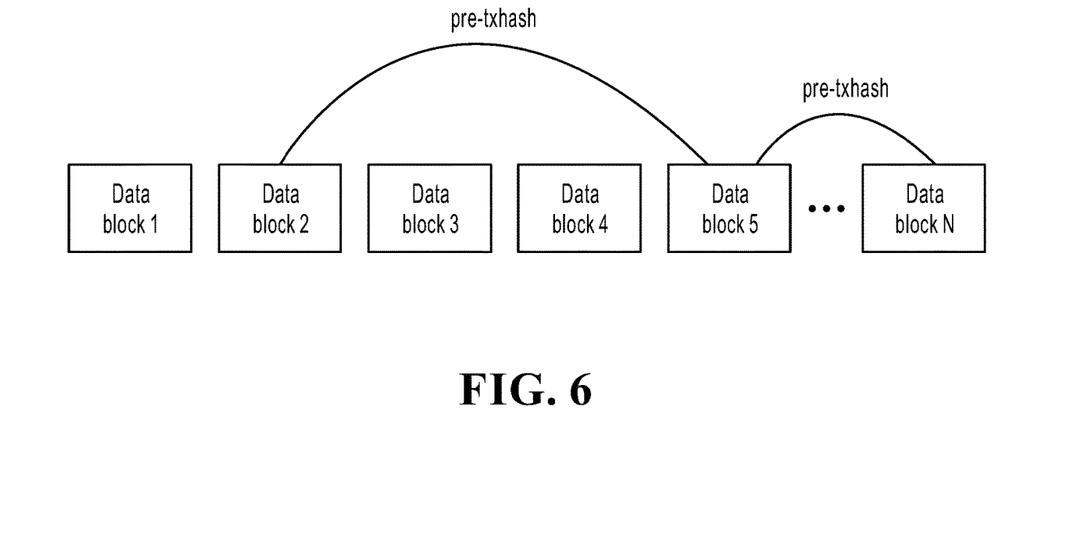
FIG. 6 is a schematic diagram illustrating data blocks including data records in a set of data records, according to an implementation of the present specification.

It is easy to understand that in the set of data records, the data records are usually stored in different data blocks, that is, in a blockchain system in which a transaction is performed based on a UTXO, a previous transaction of a transaction is usually stored in another data block; and in a blockchain-like system, data records including the same service attribute are also usually stored in different data blocks. FIG. 6 is a schematic diagram illustrating data blocks including data records in a set of data records, according to an implementation of the present specification.

After the set of data records is determined, the data blocks including the data records can be respectively determined.

In the blockchain-like ledger, when a data record includes a service attribute, a second index about the data record can be established based on the service attribute, where the index is an inverted index. In the second index, a primary key is a value of the service attribute included in the data record.

A specific writing method is creating an index record that uses the value of the service attribute as a primary key in an index table, when the primary key in the second index does not include the value of the service attribute.

When the primary key in the index includes the value of the service attribute, location information of the data record is written in a record including the value of the specified service attribute in the second index. It is worthwhile to note that the writing here is not overwriting, but is adding the location information to a value of the index record, where the location information exists in the index record in parallel with other location information.

Table 1 is second index table example, according to an implementation of the present specification. Key is a specific value of a service attribute, and each array in the value part is one piece of location information. The first part of each array is a height of a block, and the second part of the array is a sequence number of a data record in the data block. A data record can be uniquely determined based on a block height and a sequence number. It is easy to understand that in the index table, one key can correspond to multiple pieces of location information.

TABLE 1

| Key | Value |
| --- | --- |
| 0X123456 | (2, 08), (2, 10), (300, 89), (300, 999) |
| 344X0001 | (5, 01), (8, 22) |
| . . . | . . . |

Therefore, in the database, matching can be performed from the index table based on a specific value of a service attribute. For example, after Table 1 is created, if a value of a service attribute included in a data record is "0X123456", four data records corresponding to the value can be obtained by querying Table 1, and block heights (2 and 300) of data blocks including the four data records can be directly obtained from the table.

It can be understood that all the data records obtained in the previously described way are data records directly related to a hash value entered by a user.

S307. Perform integrity verification on each one of the data blocks that store the data records.

A method for performing integrity verification on a data block is as follows: A hash value of the data block is recalculated based on data records in the data block and a hash value of a previous data block (a calculation method is the same as a method for calculating a hash value of the data block when the data block is generated), consistency comparison is performed on the hash value and the previously stored hash value of the data block (for example, consistency comparison is performed on the hash value and the hash value of the data block that is pre-stored in an index); and the verification succeeds if the hash value is the same as the previously stored hash value of the data block, or the verification fails if the hash value is different from the previously stored hash value of the data block.

In this implementation of the present application, for a verification request initiated by a user, a data record can be obtained based on a hash value, and then source tracing can be initiated based on a value of a service attribute included in the data record, to obtain a set of data records directly related to the value of the service attribute, so that corresponding integrity verification can be performed on each one of the data blocks that store the data records in the set of data records, thereby improving verification efficiency and user experience.

In an implementation, when the server needs to obtain the set of data records through traversing and perform verification (for example, when the server obtains a related path of a transaction in a bitcoin system), because the path is obtained in serial, the server can obtain the transaction by using a single thread and perform verification by using multiple treads.

That is, one thread is created to trace the entire path in serial, to obtain a block height of each transaction in the path, and to write in a status array or a shared memory (that is, any other verification threads can read the block height from the shared memory). A status is given for each block height in the array, to indicate a verification status of the data block. For example, 0 is "unverified", 1 is "being verified", and 2 is "verified". Therefore, a form of the status array can be [2, 0], [300, 1], [1000, 2], . . . .

In addition, multiple verification threads are created to verify corresponding data blocks obtained based on unverified block heights in the array, and status values in the status array are correspondingly modified during the verification and after the verification. As such, when data blocks to be verified are determined in serial, determined data blocks to be verified can be verified in parallel by using multiple verification threads, thereby improving verification efficiency.

Figure 4:
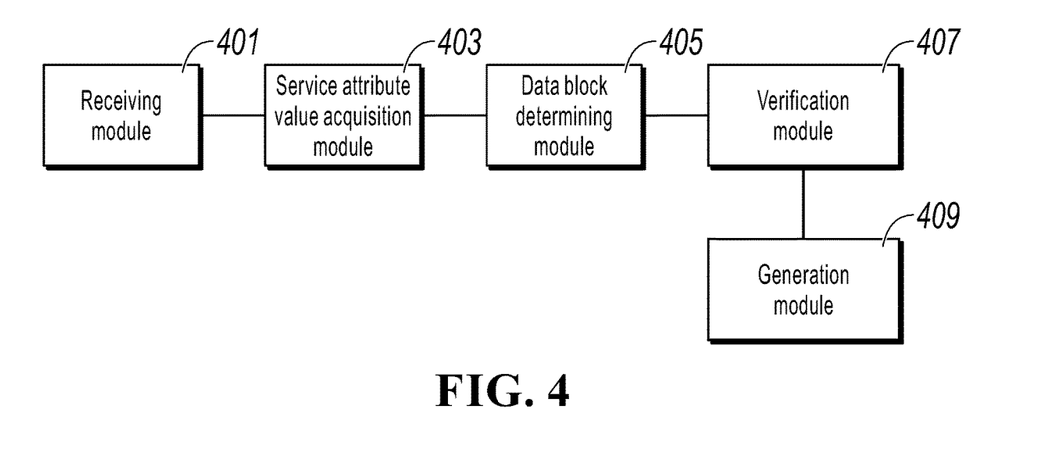
FIG. 4 is a schematic structural diagram illustrating a verification apparatus in a blockchain-type ledger, according to an implementation of the present specification.

Correspondingly, an implementation of the present specification further provides a verification apparatus in a blockchain-type ledger, where the apparatus is applied to a server that stores data by using a blockchain-type ledger. FIG. 4 is a schematic structural diagram illustrating a verification apparatus in a blockchain-type ledger, according to an implementation of the present specification. The apparatus includes: receiving module 401, configured to receive a verification request, where the verification request includes a hash value to be verified; service attribute value acquisition module 403, configured to determine a data record corresponding to the hash value to be verified, and obtain a value of a service attribute included in the data record, where the service attribute is used to identify a type of the data record; data block determining module 405, configured to determine a set of data records corresponding to the value of the service attribute in the ledger, and determine each one of data blocks that store the data records; and verification module 407, configured to perform integrity verification on each one of the data blocks that store the data records.

Further, the blockchain-type data storage ledger includes a blockchain ledger or a blockchain-like ledger that centrally stores data; and the apparatus further includes generation module 409 for generating the blockchain-like ledger, configured to: receive data records to be stored, and determine hash values of the data records, where the data records include service attributes; and when a predetermined block generation condition is reached, determine data records to be written in a data block, and generate the Nth data block including a hash value of the data block and the data records, which specifically includes: when N=1, a hash value and a block height of an initial data block are given based on a predetermined way; or when N>1, a hash value of the Nth data block is determined based on the data records to be written in the data block and a hash value of the (N−1)th data block, and the Nth data block including the hash value of the Nth data block and the data records is generated, where a block height of the data block monotonically increases based on a sequence of block generation times.

Further, the predetermined block generation condition includes: a quantity of data records to be stored reaches a quantity threshold; or a time interval from the last block generation time reaches a time threshold.

Further, data block determining module 405 is configured to obtain the set of data records corresponding to the value of the service attribute through querying based on previously created indexes, where the indexes include mapping relationships between the value of the service attribute and location information of the data records; or obtain the set of data records corresponding to the value of the service attribute through querying by traversing data records in the ledger.

Further, data block determining module 405 is configured to write a block height of each one of the data blocks that store the data records in a previously created array, where each element in the array includes a block height of a data block and a verification status of the data block, and the verification status includes "unverified", "being verified", or "verified"; and correspondingly, verification module 407 is configured to create multiple verification threads, obtain unverified data blocks from the array, and perform integrity verification on the unverified data blocks.

An implementation of the present specification further provides a computer device. The computer device includes at least a memory, a processor, and a computer program that is stored in the memory and that can run on the processor. The processor implements the verification method in the blockchain-type ledger shown in FIG. 3 when executing the program.

Figure 5:
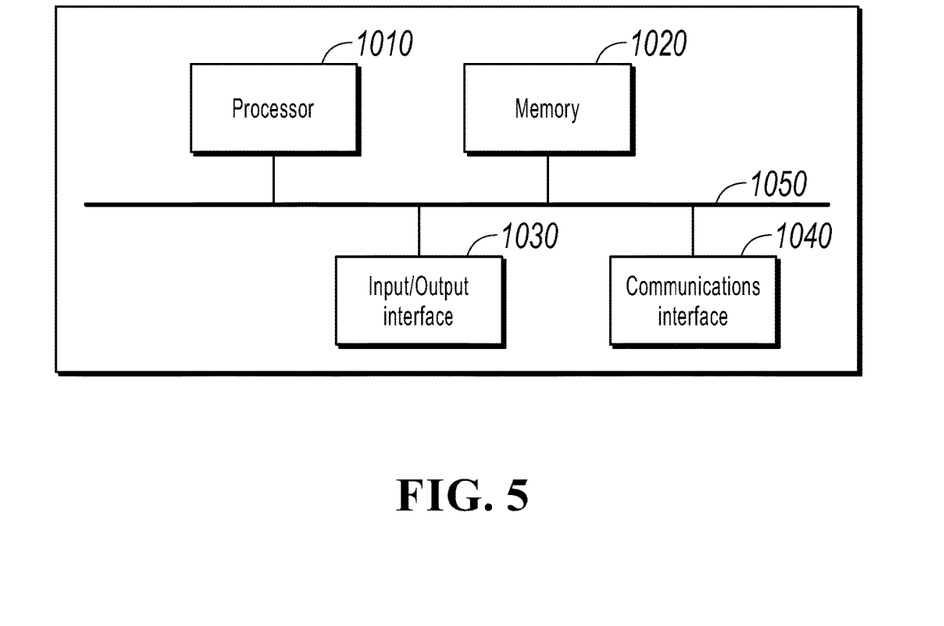
FIG. 5 is a schematic structural diagram illustrating a device for configuring the method in the implementations of the present specification.

FIG. 5 is a more detailed schematic diagram illustrating a hardware structure of a computing device, according to an implementation of the present specification. The device can include processor 1010, memory 1020, input/output interface 1030, communications interface 1040, and bus 1050. Processor 1010, memory 1020, input/output interface 1030, and communications interface 1040 are communicatively connected to each other inside the device by using bus 1050.

Processor 1010 can be implemented by using a general central processing unit (CPU), a microprocessor, an application-specific integrated circuit (ASIC), one or more integrated circuits, etc., and is configured to execute a related program, to implement the technical solutions provided in the implementations of the present specification.

Memory 1020 can be implemented by using a read-only memory (ROM), a random access memory (RAM), a static storage device, a dynamic storage device, etc. Memory 1020 can store an operating system and another application program. When the technical solutions provided in the implementations of the present specification are implemented by using software or firmware, related program code is stored in memory 1020, and is invoked and executed by processor 1010.

Input/output interface 1030 is configured to be connected to an input/output module, to input or output information. The input/output module (not shown in the figure) can be configured in the device as a component, or can be externally connected to the device, to provide a corresponding function. The input module can include a keyboard, a mouse, a touchscreen, a microphone, various sensors, etc. The output module can include a monitor, a speaker, an oscillator, an indicator, etc.

Communications interface 1040 is configured to be connected to a communications module (not shown in the figure), to implement a communication interaction between the device and another device. The communications module can perform communication in a wired way (for example, by using USB or a network cable), or can perform communication in a wireless way (for example, by using a mobile network, Wi-Fi, or Bluetooth).

Bus 1050 includes a channel for transmitting information between components (for example, processor 1010, memory 1020, input/output interface 1030, and communications interface 1040) of the device.

It is worthwhile to note that although only processor 1010, memory 1020, input/output interface 1030, communications interface 1040, and bus 1050 of the device are shown, in a specific implementation process, the device can further include other components required for normal running. In addition, a person skilled in the art can understand that the device can include only components necessary for implementing the solutions in the implementations of the present specification, but does not necessarily include all the components shown in the figure.

An implementation of the present specification further provides a computer readable storage medium. The computer readable storage medium stores a computer program, and the verification method in a blockchain-type ledger shown in FIG. 3 is implemented when the program is executed by a processor.

The computer readable medium includes persistent, non-persistent, movable, and unmovable media that can store information by using any method or technology. The information can be a computer readable instruction, a data structure, a program module, or other data. Examples of the computer storage medium include but are not limited to a phase-change RAM (PRAM), a static RAM (SRAM), a dynamic RAM (DRAM), a RAM of another type, a ROM, an electrically erasable programmable read only memory (EEPROM), a flash memory or another memory technology, a compact disc read-only memory (CD-ROM), a digital versatile disc (DVD) or another optical storage, a cassette, a cassette magnetic disk storage, or another magnetic storage device, or any other non-transmission medium. The computer storage medium can be configured to store information that can be accessed by a computing device. As defined in the present specification, the computer readable medium does not include computer readable transitory media such as a modulated data signal and a carrier.

It can be understood from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be specifically implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email sending/receiving device, a game console, a tablet computer, a wearable device, or any combination of these devices.

The implementations of the present specification are described in a progressive way. For same or similar parts of the implementations, mutual references can be made to the implementations. Each implementation focuses on a difference from other implementations. Particularly, a device implementation is similar to a method implementation, and therefore is described briefly. For a related part, references can be made to some descriptions in the method implementation. The previously described apparatus implementations are merely examples. The modules described as separate parts may or may not be physically separate. During implementation of the solutions in the implementations of the present specification, functions of the modules can be implemented in one or more pieces of software and/or hardware. Some or all of the modules can be selected based on an actual demand to implement the objective of the solutions of the implementations. A person of ordinary skill in the art can understand and implement the implementations of the present specification without creative efforts.

The previous descriptions are merely specific implementations of the implementations of the present specification. It is worthwhile to note that a person of ordinary skill in the art can further make improvements or polishing without departing from the principle of the implementations of the present specification, and the improvements or polishing shall fall within the protection scope of the implementations of the present specification.

What is claimed is:

1. A computer-implemented method, comprising:
   receiving, by a server that stores data using a blockchain-type data storage ledger, a verification request for verifying data that is currently stored in the blockchain-type data storage ledger, wherein the verification request comprises a hash value of a data record of the blockchain-type data storage ledger;
   obtaining, by the server, the data record of the blockchain-type data storage ledger that corresponds to the hash value to be verified;
   obtaining, by the server, a value of a service attribute included in the data record, wherein the service attribute is an identification field of the data record;
   determining, by the server, a set of data records of the blockchain-type data storage ledger that each include the value of the service attribute;
   determining, by the server, data blocks of the blockchain-type data storage ledger that store data records included in the set of data records; and
   performing, by the server, integrity verification on the data blocks that store the data records included in the set of data records, the performing comprising:
      writing, into a shared memory, for each data block of the data blocks that store the data records included in the set of data records, (i) a block height of the data block, and (ii) a verification status of the data block;
      creating multiple verification threads for verifying the data blocks;
      obtaining each data block having a verification status that indicates that the data block has not been verified, based on the block height and the verification status of the data block according to the shared memory;
      using the multiple verification threads to verify, in parallel, the data blocks that have been obtained; and
      updating the verification statuses of the data blocks in the shared memory to indicate their current verification statuses.

2. The computer-implemented method of claim 1, wherein the blockchain-type data storage ledger is a blockchain ledger.

3. The computer-implemented method of claim 1, wherein the blockchain-type data storage ledger is a blockchain-like ledger that centrally stores data, the method further comprising generating the blockchain-like ledger, wherein the generating comprises:
   receiving data records to be stored, wherein the data records include one or more service attributes;
   determining hash values of the data records; and
   in response to a predetermined block generation condition being reached, determining data records to be written in a new data block, and generating the new data block comprising a hash value of the new data block and the data records, wherein a block height of the new data block monotonically increases based on a sequence of block generation times.

4. The computer-implemented method of claim 3, wherein the predetermined block generation condition comprises:
   a quantity of data records to be stored reaching a quantity threshold; or
   a time interval from a last block generation time reaching a time threshold.

5. The computer-implemented method of claim 1, wherein determining the set of data records of the blockchain-type data storage ledger comprises:
   obtaining the set of data records that each include the value of the service attribute by querying one or more previously created indexes associated with the blockchain-type data storage ledger, wherein the previously created indexes comprise mapping relationships between the value of the service attribute and location information of the data records.

6. The computer-implemented method of claim 1, wherein determining the set of data records of the blockchain-type data storage ledger comprises:
   obtaining the set of data records corresponding to the value of the service attribute by traversing data records in the blockchain-type data storage ledger.

7. The computer-implemented method of claim 1, wherein the verification status being of the data block is unverified, being verified, or verified, wherein the verification status of the data block is updated in the shared memory during verification of the data block and after verification of the data block has been completed.

8. A non-transitory, computer-readable medium storing one or more instructions executable by a computer system to perform operations comprising:
   receiving, by a server that stores data using a blockchain-type data storage ledger, a verification request for verifying data that is currently stored in the blockchain-type data storage ledger, wherein the verification request comprises a hash value of a data record of the blockchain-type data storage ledger;
   obtaining, by the server, the data record of the blockchain-type data storage ledger that corresponds to the hash value to be verified;
   obtaining, by the server, a value of a service attribute included in the data record, wherein the service attribute is an identification field of the data record;
   determining, by the server, a set of data records of the blockchain-type data storage ledger that each include the value of the service attribute;
   determining, by the server, data blocks of the blockchain-type data storage ledger that store data records included in the set of data records; and
   performing, by the server, integrity verification on the data blocks that store the data records included in the set of data records, the performing comprising:
      writing, into a shared memory, for each data block of the data blocks that store the data records included in the set of data records, (i) a block height of the data block, and (ii) a verification status of the data block;
      creating multiple verification threads for verifying the data blocks;
      obtaining each data block having a verification status that indicates that the data block has not been verified, based on the block height and the verification status of the data block according to the shared memory;

using the multiple verification threads to verify, in parallel, the data blocks that have been obtained; and
updating the verification statuses of the data blocks in the shared memory to indicate their current verification statuses.

9. The computer-readable medium of claim 8, wherein the blockchain-type data storage ledger is a blockchain ledger.

10. The computer-readable medium of claim 8, wherein the blockchain-type data storage ledger is a blockchain-like ledger that centrally stores data, the operations further comprising generating the blockchain-like ledger, wherein the generating comprises:
receiving data records to be stored, wherein the data records include one or more service attributes;
determining hash values of the data records; and
in response to a predetermined block generation condition being reached, determining data records to be written in a new data block, and generating the new data block comprising a hash value of the new data block and the data records, wherein a block height of the new data block monotonically increases based on a sequence of block generation times.

11. The computer-readable medium of claim 10, wherein the predetermined block generation condition comprises:
a quantity of data records to be stored reaching a quantity threshold; or
a time interval from a last block generation time reaching a time threshold.

12. The computer-readable medium of claim 8, wherein determining the set of data records of the blockchain-type data storage ledger comprises:
obtaining the set of data records that each include the value of the service attribute by querying one or more previously created indexes associated with the blockchain-type data storage ledger, wherein the previously created indexes comprise mapping relationships between the value of the service attribute and location information of the data records.

13. The computer-readable medium of claim 8, wherein determining the set of data records of the blockchain-type data storage ledger comprises:
obtaining the set of data records corresponding to the value of the service attribute by traversing data records in the blockchain-type data storage ledger.

14. The computer-readable medium of claim 8, wherein the verification status of the data block is unverified, being verified, or verified, wherein the verification status of the data block is updated in the shared memory during verification of the data block and after verification of the data block has been completed.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a server that stores data using a blockchain-type data storage ledger, a verification request for verifying data that is currently stored in the blockchain-type data storage ledger, wherein the verification request comprises a hash value of a data record of the blockchain-type data storage ledger;
obtaining, by the server, the data record of the blockchain-type data storage ledger that corresponds to the hash value to be verified;
obtaining, by the server, a value of a service attribute included in the data record, wherein the service attribute is an identification field of the data record;
determining, by the server, a set of data records of the blockchain-type data storage ledger that each include the value of the service attribute;
determining, by the server, data blocks of the blockchain-type data storage ledger that store data records included in the set of data records; and
performing, by the server, integrity verification on the data blocks that store the data records included in the set of data records, the performing comprising:
writing, into a shared memory, for each data block of the data blocks that store the data records included in the set of data records, (i) a block height of the data block, and (ii) a verification status of the data block;
creating multiple verification threads for verifying the data blocks;
obtaining each data block having a verification status that indicates that the data block has not been verified, based on the block height and the verification status of the data block according to the shared memory;
using the multiple verification threads to verify, in parallel, the data blocks that have been obtained; and
updating the verification statuses of the data blocks in the shared memory to indicate their current verification statuses.

16. The computer-implemented system of claim 15, wherein the blockchain-type data storage ledger is a blockchain ledger.

17. The computer-implemented system of claim 15, wherein the blockchain-type data storage ledger is a blockchain-like ledger that centrally stores data, the operations further comprising generating the blockchain-like ledger, wherein the generating comprises:
receiving data records to be stored, wherein the data records include one or more service attributes;
determining hash values of the data records; and
in response to a predetermined block generation condition being reached, determining data records to be written in a new data block, and generating the new data block comprising a hash value of the new data block and the data records, wherein a block height of the new data block monotonically increases based on a sequence of block generation times.

18. The computer-implemented system of claim 17, wherein the predetermined block generation condition comprises:
a quantity of data records to be stored reaching a quantity threshold; or
a time interval from a last block generation time reaching a time threshold.

19. The computer-implemented system of claim 15, wherein determining the set of data records of the blockchain-type data storage ledger comprises:
obtaining the set of data records that each include the value of the service attribute by querying one or more previously created indexes associated with the blockchain-type data storage ledger, wherein the previously created indexes comprise mapping relationships between the value of the service attribute and location information of the data records.

20. The computer-implemented system of claim 15, wherein determining the set of data records of the blockchain-type data storage ledger comprises:

obtaining the set of data records corresponding to the value of the service attribute by traversing data records in the blockchain-type data storage ledger.

21. The computer-implemented system of claim 15, wherein the verification status of the data block is unverified, being verified, or verified, wherein the verification status of the data block is updated in the shared memory during verification of the data block and after verification of the data block has been completed.

* * * * *

UNITED STATES PATENT AND TRADEMARK OFFICE
CERTIFICATE OF CORRECTION

PATENT NO.       : 11,115,189 B2                            Page 1 of 1
APPLICATION NO.  : 16/809251
DATED            : September 7, 2021
INVENTOR(S)      : Xinying Yang It is certified that error appears in the above-identified patent and that said Letters Patent is hereby corrected as shown below:

In the Claims

Column 12, Line 28, in Claim 7, after "status" delete "being".

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*